United States Patent [19]
Nimmersjo

[11] 3,878,460
[45] Apr. 15, 1975

[54] ARRANGEMENT FOR DETECTING THE DIRECTION OF A FAULT FROM A MEASURING POINT

[75] Inventor: Gunnar Nimmersjo, Vasteras, Sweden

[73] Assignee: Allmanna Svenska Elektriska Aktiebolaget, Vasteras, Sweden

[22] Filed: Nov. 1, 1973

[21] Appl No.: 411,806

[30] Foreign Application Priority Data
Nov. 6, 1972  Sweden............................. 14324/72

[52] U.S. Cl................ 324/52; 317/27 R; 317/36 D; 317/50
[51] Int. Cl...... G01r 31/08; H02h 3/38; H02h 3/22
[58] Field of Search........ 324/51, 52; 317/36 D, 43, 317/50, 27 R

[56] References Cited
UNITED STATES PATENTS

| | | | |
|---|---|---|---|
| 2,808,566 | 10/1957 | Douma................ | 324/127 |
| 2,981,867 | 4/1961 | Hopkins et al..................... | 317/36 D |
| 3,048,744 | 8/1962 | Warrington...................... | 317/36 D |
| 3,396,310 | 8/1968 | Logan.............................. | 317/43 X |
| 3,753,089 | 8/1973 | Gunn et al........................... | 324/52 |

*Primary Examiner*—Gerard R. Strecker

[57] ABSTRACT

In order to determine the direction of a fault in a power network from the measuring point, each phase of the line is provided with a detector part with a band exclusion filter for removing the part of a signal which has the operating frequency of the network, which signal is proportional to the current at the measuring point, and another band exclusion filter for removing the part of another signal which has the operating frequency of the network, which is proportional to the voltage at the measuring point.

A directional detector is fed with the two filtered signals which contain substantially only transients. The output of the directional detector is connected to a tripping relay and a blocking relay.

4 Claims, 2 Drawing Figures

ARRANGEMENT FOR DETECTING THE DIRECTION OF A FAULT FROM A MEASURING POINT

BACKGROUND OF THE INVENTION

1. Field of the Invention

The present invention relates to a directional wave detector for determining, with the help of the direction of movement of a transient wave passing a measuring point in a power-line network, the direction to the fault which has caused the transient wave.

2. The Prior Art

When a fault occurs in a power-line network, this gives cause to transient waves moving along the line. The invention is based on the use of the direction of movement of these transient waves at a measuring point to determine the direction to the source of the disturbance. In the transient wave which moves towards the measuring point of the relay from the location of the fault, the current and voltage waves have different signs, thus obtaining the relation $u = -Z_o \cdot i$, where the voltage is designated $u$, the current $i$ and the surge impedance $Z_o$. The voltage and current waves thus have opposite signs, seen in the supervising direction of the relay towards the fault. If the fault occurs in the opposite direction from the measuring point, the relay perceives that the voltage and current waves have the same sign $u = Z_o \cdot i$ and indicates the fault as lying behind the protection zone.

The transient waves which move along the line from the location of a fault contain transients within a wide frequency range. By removing the part of the transient waves, which has the operating frequency of the network, in a band exclusion filter, so that only the low-frequency and high-frequency transients remain, and thereafter comparing the signs of the voltage and current waves, the direction of movement of the transient waves and also the direction to the location of the fault can be determined. If the two waves have the same sign the fault lies behind the protection zone of the relay, but if they have different signs the fault lies within the protection zone.

SUMMARY OF THE INVENTION

According to the invention, the direction of movement of a transient wave passing a measuring point in a network is detected by detector parts one for each phase. Each detector part has a first band exclusion filter for removing the part of the first signal which has the operating frequency of the network and is proportional to the current at the measuring point, and a second band exclusion filter which removes the part of the second signal which has the operating frequency of the network, which signal is proportional to the voltage at the measuring point. A directional detector is supplied with the two filter signals, which principally contain only transients. The output of the directional detector is connected to a tripping relay and to a blocking relay.

BRIEF DESCRIPTION OF THE DRAWINGS

The accompanying drawings show in FIG. 1 an example of the wiring diagram of a three-phase directional wave detector according to the invention.

DESCRIPTION OF THE PREFERRED EMBODIMENTS

Figure 1:
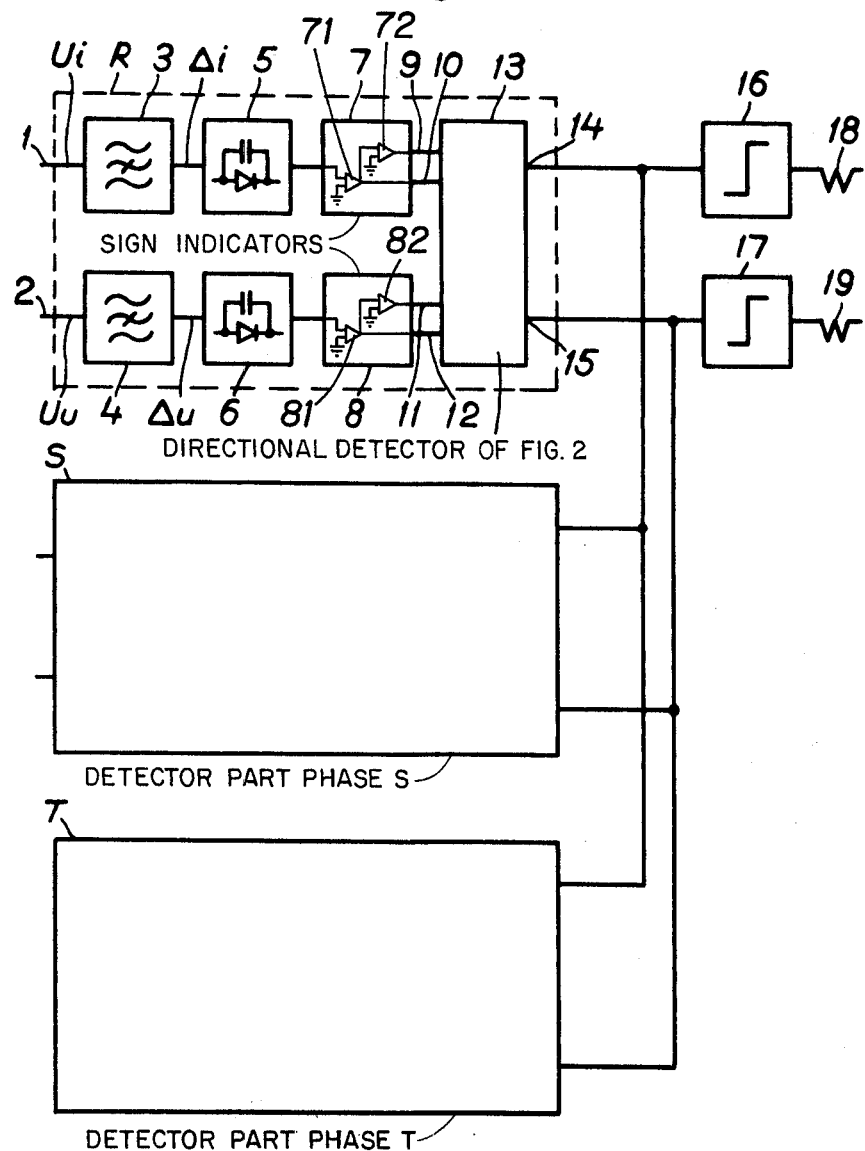

The complete detector comprises three detector parts R, S, T, one for each phase in a three-phase system. Of the three parts only part R is shown in full. The other two parts are only indicated by a frame, and in the following only part R will be described.

The detector part has two inputs 1 and 2. To the first input 1 a signal Ui is supplied which is proportional to the current at the measuring point, and to the other input 2 a signal Uu is supplied which is proportional to the voltage at the measuring point. The two signals are each supplied to a band exclusion filter 3,4, which removes the part of the signal which has the operating frequency of the network. The filtered signals $\Delta i$ and $\Delta u$, respectively, which now contain only low-frequency and high-frequency transients, are each supplied to an integrator 5,6. The outputs of the integrator are each supplied to the input of a sign indicator 7,8 each having two outputs 9,10 and 11,12, respectively, which in turn are connected to the corresponding inputs of a directional detector 13. In another embodiment of the directional detector, the sign indicators and the directional detector can be built together into one unit which in such a case is also called a directional detector. This device will then have two inputs instead of the four shown in the drawing. If separate sign indicators are used, a signal occurs on one output, for example 9 and 11 in the case of a positive incoming signal, whereas in the case of a negative incoming signal the output signal from the sign indicators will occur on the outputs 10 and 12. The directional detector 13 has two outputs 14 and 15, of these the upper output 14 is connected to a tripping relay 18 by way of a level-sensing device 16 and the output 15 is connected to a blocking relay 19 by way of a level-sensing device 17.

Figure 2:
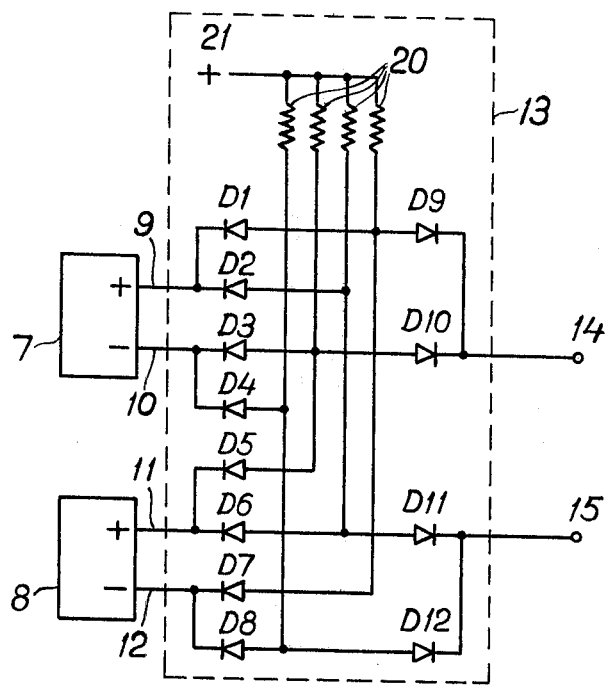
FIG. 2 shows in detail the directional detector.

As will be seen from FIG. 2, the directional detector 13 consists of a number of diodes D1-D12, which are connected to the positive pole of a voltage source 21 by the aid of resistors 20. The diodes are connected to the input terminals 9-12 and output terminals 14,15, which appears from the Figure.

The sign indicators and the directional detector sense and combine the signals which come from the integrators 5 and 6 in such a way that, if the two incoming signals have different signs, an output signal occurs on the output 14, whereas, if the incoming signals have the same signs, an output signal occurs on the output 15. If the output signal on the output 14 has greater amplitude than what corresponds to the setting of the device 16, the relay 18 gives a tripping signal. In the same way, the relay 19 gives a blocking signal if the signal occurring on the output 15 has higher amplitude than what corresponds to the setting of the device 17.

The sign detector 7 has two amplifiers 71 and 72 connected as shown. The input of amplifier 71 is connected to the output of the integrator 5. The output of the amplifier 71 is connected to the input of amplifier 72 and to output terminal 10 and the output of the amplifier 72 is connected to the output terminal 9.

If the input signal to the sign detector 7 is positive, there appears a positive output signal on terminal 9 and a negative signal on terminal 10. The same thing will happen in sign detector 8. If the incoming signal $\Delta i$ and $\Delta u$, respectively, changes its sign, the signals on the output terminal 9, 10 and 11, 12, respectively, change signs.

When a positive input signal is fed to both sign detectors 7 and 8, there will be a positive output signal on terminals 9 and 11 and negative signals on terminals 10 and 12, as shown in FIG. 2. The positive signal from terminal 9 passes through diodes D2 and D11 to output terminal 15 and the positive signal on terminal 11 passes through diodes D6 and D11 to output terminal 15. In a similar way it is seen that there will appear a signal on terminal 15 if there are positive input signals on terminals 10 and 12. But if positive signals appear simultaneously on terminals 9 and 12 or 10 and 11, there will be a signal on the output terminal 14.

The combination of the integrators 5 and 6, respectively, and the level-sensing devices 16 and 17, respectively, makes it possible for the wave detector to distinguish between different types of disturbances, for example those caused by lightning or by real faults in the network. A disturbance caused by lightning may consist of transients with great amplitude, but as a rule they are very short-lived, which means that the amplitude of the signals emanating from the integrators 5,6 is low. The level devices 16,17 may be adjusted so that they do not let through signals with such a low amplitude. Faults in the network, and they may be earth faults or faults of the phase-to-phase type, normally lead to such long transients that the output signal on the integrators is higher than what corresponds to the adjustment of the level devices, so that the wave detector reacts to them.

In the embodiment of the invention shown and described, an integrator 5 and 6, respectively, is used for the signal treatment. Even if such a circuit is the most appropriate one in most cases, it would be possible, however, to use a derivative device for rapid indication. According to a further variant, it is possible to abolish the integrating as well as the derivative device and feed the filtered signal $\Delta i$ and $\Delta u$, respectively, directly on to the sign indicators and thereafter on to the directional detector 13.

I claim:

1. Directional wave detector for determining, with the help of the direction of movement of a transient wave passing a measuring point at a fault in the network, the direction to the fault which has caused the transient wave and which comprises a detector part (R,S,T,) for each phase in the supervised network, each such detector part (R,S,T) having a first band exclusion filter (3) for removing the part of a first signal ($U_i$), which has the operating frequency of the network, said first signal being proportional to the current at the measuring point, a second band exclusion filter (4) for removing the part of a second signal ($U_u$), which has the operating frequency of the network, said second signal being proportional to the voltage at the measuring point, a directional detector (13) having first and second pairs of input terminals (9,10 and 11,12) and first and second output terminals (14,15), means to supply a signal from the first filter to one of the first pair of input terminals when the first filtered signal is positive and to the other of the first pair of input terminals when the first signal is negative, means to supply a signal from the second filter to one of the second pair of input terminals when the second filtered signal is positive and to the other of said second pair of input terminals when the second signal is negative, said two filtered signals consisting of those parts of said first and second signals ($U_i$, $U_u$) which have passed the filters and which for the main part contain only transients, said directional detector including means to supply a signal to the first output terminal when the signals supplied to the terminals of the first and second pairs of input terminals have different signs and to the second output terminal when the signals supplied to the terminals of the first and second pairs of input terminals have the same sign, a tripping relay (18) connected to said first output terminal (14) for producing a tripping signal when a signal is supplied to said first output terminal, and a blocking relay (19) connected to said second output terminal (15) for producing a blocking signal when a signal is supplied to said second output terminal.

2. Directional wave detector according to claim 1, having an integrator (5,6) connected between the band exclusion filter (3,4) and the directional detector (13).

3. Directional wave detector according to claim 1, having a first and second sign indicator (7,8) with input and output terminals, said first filtered signal ($\Delta i$) being fed to the input terminal of said first sign indicator (7), the output terminals of the first sign indicator (7) being connected to said first input terminals (9,10) of the directional detector (13), said second filtered signal ($\Delta u$) being fed to the input terminal of said second sign indicator (8), the output terminals of the second sign indicator (8) being connected to said second input terminals (11,12) of the directional detector.

4. Directional wave detector according to claim 1, in which level sensing devices connect the outputs of the directional detector to the tripping and blocking relays.

* * * * *